United States Patent [19]

Skvára et al.

[11] Patent Number: 5,125,976
[45] Date of Patent: Jun. 30, 1992

[54] METHOD OF MILLING THE PORTLAND CLINKER FOR THE PRODUCTION OF GYPSUMLESS PORTLAND CEMENTS

[75] Inventors: František Škvára, Prague; Jaroslav Hrazdíra, Brandýsek; Tomáš Všetečka, Prague, all of Czechoslovakia

[73] Assignee: Ceskoslovenska Akademie Ved, Prague, Czechoslovakia

[21] Appl. No.: 502,538

[22] Filed: Mar. 30, 1990

[30] Foreign Application Priority Data

Mar. 30, 1989 [CS] Czechoslovakia .................. 1979-89

[51] Int. Cl.$^5$ .......................... C04B 24/16; C04B 7/02
[52] U.S. Cl. ...................................... 106/724; 106/664; 106/725; 106/728; 106/764; 106/809; 106/810
[58] Field of Search ............... 106/664, 703, 713, 724, 106/725, 728, 739, 764, 809, 810

[56] References Cited

U.S. PATENT DOCUMENTS

| | | | |
|---|---|---|---|
| 3,615,785 | 10/1971 | Moorer et al. | 106/90 |
| 3,689,297 | 9/1972 | Dybalski | 106/280 |
| 4,069,063 | 1/1978 | Ball | 106/97 |

Primary Examiner—Karl Group
Assistant Examiner—Michael Marcheschi
Attorney, Agent, or Firm—Leydig, Voit & Mayer

[57] ABSTRACT

A method for milling Portland clinker for the production of gypsumless Portland cements is provided. The method comprises milling the Portland clinker in the presence of 0.01 to 0.05 weight % of a synthetic, organic, surface-active substance with wetting properties that is stable in an alkaline medium of pH 9–12, with the exception of the triethanolamide of dodecylbenzylsulphonic acid, to produce gypsumless Portland cements with specific surfaces of 350–750 m$^2$/kg.

2 Claims, No Drawings

METHOD OF MILLING THE PORTLAND CLINKER FOR THE PRODUCTION OF GYPSUMLESS PORTLAND CEMENTS

FIELD OF THE INVENTION

The present invention relates to a method of milling Portland clinker for the production of gypsumless Portland cements with a specific surface of from 350 to 750 m$^2$/kg.

BACKGROUND OF THE INVENTION

The use of specific admixtures during the milling process of cements has been known since the 1930's. Milling admixtures—milling intensifiers—are substances that prevent the aggregation of particles or help scatter the grist during the milling process. The milling admixtures must not adversely affect the qualities of cements. The milling admixtures further inhibit the grist from sticking to the milling bodies, thereby increasing the output of the mill. The use of milling admixtures reduces the cost of milling and enables the production of high quality cements. The milling admixtures also ameliorate the starting resistance and the processes of emptying silos and/or the storage life of cements.

Actually, several substances are used as milling admixtures for the production of cements, especially Portland cements, such as calcium ligninsulphonate containing no monosaccharides, a mixture of triethanolamine with calcium ligninsulphonate, different types of fatty acids, different types of diolefins, especially glycols, and many other commercial mixtures. (W. H. Duda, Cement Data Book, 1985). In the Federal Republic of Germany liquid milling admixtures, such as aminoacetate, ethylene glycol or propylene glycol, are used for the production of PC 550 (O. Labahn and B. Kohlhaas, Ratgeber für Zement-Ingenieure, 1982). Most of the research done in this field is oriented towards gaining new milling admixtures having the following properties: positive influence on the milling process, reduction of power consumption in milling, greater specific surface of the product, and no negative influence on the qualities of cements. Many substances that positively influence the milling process of cements have been mentioned in technical literature and patents. Lists and surveys of these substances are to be found in Cement Research Progress, 1974–1978, for example.

Related to the problem of milling admixtures is the set of problems concerning the new type of inorganic hydraulic binding agents, i.e., gypsumless cements. These cements are based on the Portland clinker or white cement and are ground in the absence of gypsum. The regulating influence of the gypsum is supplemented by the synergistically acting mixture of alkaline metals, e.g., carbonates, hydrogen carbonates, silicates and hydroxides, and sulphonated polyelectrolytes, such as derivatives of lignin, sulphonated polyphenolates or other liquefying agents used as plasticizers. Gypsumless Portland cements are outstanding because of their superior qualities compared to common Portland cements, especially in the preparation of pastes, mortars, and concretes having a substantially lower cement-water ratio. The properties of these gypsumless cements have been already described, e.g., in the Czech author's certificate 257 315. These properties of gypsumless cements also can be attained by increasing the milling fineness beyond that of common Portland cements.

The above solutions have been directed, however, to attaining a higer specific surface for cements only. Another solution for problems of gypsumless cements has been presented in U.S. Pat. No. 3,689,294 (Brunauer). In the '297 patent, as in M. Yudenfreund's publication and in other publications, there are described hardened Portland cement pastes of low porosity (Cement and Concrete Research 2:313–330, 1972), compositions of liquid pastes or mortars and concretes in the expanding state, based on ground cement clinkers of specific surfaces from 600 to 900 m$^2$/kg, containing at least 0.002 parts of milling admixtures and at least 0.0025 parts of alkaline earth ligninsulphonates or sulphonated lignin and at least 0.0025 parts of alkaline carbonates with a cement-water ratio in the range of from 0.20 to 0.28. These publications specify the following milling admixtures: Kraft lignin (alkali lignin), oleic acid, diethylcarbonate, ethoxylated nonylphenols with different numbers of ethoxyl groups, sodium dodecylbenzylsulphonate, mixtures of alkylsulphonates and sulphocarboxylates, sulphosuccinates, alkylated sulphosuccinates, and/or sulphosuccinates with amines and alkylsulphates or with alkylphenylpolyglycol ethers, triethanolamine, ethylene glycol, and alkylphenylsulphonates. The main feature of milling admixtures is the simultaneous presence of polar and non-polar groups in a molecule. It was not possible to prepare gypsumless cement compositions of low cement-water ratio with the given workability using Brunauer's criterion (U.S. Pat. No. 3,689,294) since the matter is unstable in alkaline medium. Stable adsorption of matter onto the surface of the cement in alkaline medium is necessary since admixtures that replace gypsum, e.g., soda and ligninsulphonate, form solutions with pH up to 11.5. Furthermore, the combination of clinker and water produces a very alkaline and limy medium. Other matters, though stable in the alkaline medium, have no wetting property for powder materials, e.g., triethanolamine, silanes, siloxanes, and stearates, so that they can not be used for the preparation of gypsumless cement compositions with a low cement-water ratio.

From all matters known up to now and applied as admixtures for the milling of Portland clinkers for gypsumless cements, only one single matter produces the requisite effects and it is, according to the invention, the triethanolamide of dodecylbenzylsulphonic acid. Its application, however, was accidental until now, when, according to the present invention, it was shown to be important for conditions in the milling of Portland clinkers.

BRIEF SUMMARY OF THE INVENTION

The object of the present invention is the milling of Portland clinkers for the production of gypsumless Portland cements with the specific surface of from 350 to 750 m$^2$/kg. The Portland clinker is ground in the presence of from 0.01 to 0.15 mass % of a synthetic, organic, surface-active substance with wetting properties that is stable in an alkaline medium of pH 9–12. The synthetic, surface-active matter can be selected from the group of alkylpolyglycol ether sulphates or alkylated alkanolamine polyglycol ethers, where the alkyl contains from 10 to 15 carbon atoms, or from the group of alkanolamides of alcohols or sulphated, ethoxylated, alkylated alcohols containing from 3 to 10 ethoxylated groups and from 10 to 15 carbon atoms in the alkyl, or from the group of ester amides of linear sulphated or sulphonated fatty acids, or sulphonated alkylaryl acids, where the linear chain contains from 5 to 20 carbon atoms, or condensates of the naphthol sulphonic acid with formaldehyde or cresol, and further from the group of alkyl betaines or sulphoalkyl betaines. The method according to the invention allows for the utilization of a large range of substances as milling admixtures for the milling of Portland clinkers for the production of gypsumless cements. The substances have not been previously utilized and provide good wetting properties for powder materials, high intensification of the milling process, non-toxicity, and enhancement of both the starting and long-life resistance of gypsumless cements.

DETAILED DESCRIPTION OF THE INVENTION

The invention is demonstrated in the following examples which, however, are not intended to limit the scope of the invention. On the contrary, the invention is intended to encompass all alternative, modified, and equivalent methods as may be included within the spirit and scope of the invention as defined by the appended claims.

EXAMPLE 1

The clinker for the research milling admixtures was taken from the cement works in Lochkov. This clinker was used to evaluate the specific surface obtained, up to the value of 750 $m^2/kg$, with various milling processes using the Seger milling machine. A 50 l ball mill was used for other experiments. A milling admixture, at a concentration of 0.03-0.15% of the clinker weight (related to 100% of the active matter or dry matter) was poured into the mill, followed by a very fine clinker (about 2.5 mm). The duration of the different milling processes was varied. The specific surface of the final product was evaluated.

The efficiency of the different milling admixtures was evaluated using the Seger apparatus and the ball mill. The applied milling admixtures are listed in Table 1. Letters A, B, C, D, E, F, G, H, I, and J stand for known milling admixtures, whereas letters K, L, M, N, O, P, R, S, T, U, and V represent the present inventive milling admixtures.

TABLE 1

| Designation | Applied Milling Admixtures Chemical Composition |
|---|---|
| A | sodium sulphosuccinate |
| B | condensate of ethylene oxide and propylene oxide |
| C | sodium monoalkylpolyglycolestersulphate |
| D | ethoxylated nonylphenol |
| E | triethanolamine |
| F | ethylene glycol |
| G | silicone oil |
| H | condensate of sulphonated phenylformaldehyde |
| I | mixture of sodium alkylbenzylsulphonate and sodium alkylsulphate |
| J | triethanolamide of the dodecylbenzylsulphonic acid |
| K | alkanolamine derivative of ethoxynonylphenol |
| L | sodium alkylpolyglycolethersulphate |
| M | ethoxylated sulphated alkylphenol |
| N | mixture of sulphated ethoxylated alcohol with monoethanolamide of coconut acid |
| O | alkylbetaine |
| P | triethanolamine salt of phenylbenzylsulphonic acid, $C_8$-$C_{14}$ alkyl mixture |
| R | ammonium salt of dodecylbenzylbenzylsulphonic acid |
| S | alkylbenzylsulphonic acid salt based on alpha-olefins. $C_{10}$-$C_{12}$ alkyl mixture |
| T | sodium salt of condensation product of beta-naphtholsulphonic acid and cresol with formaldehyde |
| U | alkanolamine salt of sulphated ethoxylated alcohol, 3-10 ethoxy groups, $C_{12}$-$C_{15}$ alkyl |
| V | sulphated ester of fatty acid, 3-10 ethoxy groups, $C_{12}$-$C_{15}$ alkyl |

Table 2 shows the results of the evaluation of the efficiency of milling admixtures.

TABLE 2

| Designation | Efficiency of Milling Admixtures Milling Efficiency-Seger Apparatus, Laboratory Ball Mill |
|---|---|
| A | slight intensifying effect, efficient beyond the specific surface of 400 $m^2/kg$ |
| B | medium intensifying effect, efficient beyond the specific surface of 200 $m^2/kg$ |
| C | as under A |
| D | as under B |
| E | strong intensifying effect, efficient beginning with the specific surface of 200 $m^2/kg$ |
| F | as under E |
| G | as under E |
| H | weak intensifying effect, efficient up to the specific surface of about 550 $m^2/kg$ |
| I | as under H |
| J | strong intensifying effect, efficient beginning with the specific surface of 350 $m^2/kg$ |
| K | strong intensifying effect, efficient beginning with the specific surface of 250 $m^2/kg$ |
| L | medium intensifying effect, efficient beginning with the specific surface of 200 $m^2/kg$ |
| M | as under L |
| N | as under L |
| O | as under L |
| P | as under J |
| R | medium intensifying effect, efficient beginning with the specific surface of 350 $m^2/kg$ |
| S | weak intensifying effect, efficient beginning with the specific surface of 450 $m^2/kg$ |
| T | strong intensifying effect, decreasing effect with increasing specific surface |
| U | strong intensifying effect, efficient beginning with the specific surface of 200 $m^2/kg$ |
| V | as under T |

The efficiency of the milling admixtures was compared with the control test, i.e., milling of the clinker with no admixtures at all.

EXAMPLE 2

The clinker from the cement works in Lochkov was ground 20:1 with the milling admixture in the ball mill up to the specific surface of 480-520 $m^2/kg$. The resulting cement was worked up in the form of a paste with a low cement-water ratio (w=0.25 and 0.21) with the admixture of 0.4% of Kortan FM (dried sulphonated sodium-ferric polyphenolate) and 1% of soda (based on the weight of the cement). The workability of pastes was evaluated according to the following empirical scale:

0—unworkable paste
1—paste flowing during vibrations only
2—paste flowing out from the agitating tank in hammering
3—paste flowing out from the agitating tank by gravitation
4—paste flowing freely out from the agitating tank
5—paste of low viscosity flowing out from the agitating tank Table 3 shows the results of the evaluation of the effect of milling admixtures on the flow characteristics of pastes and the possibilities of their workability, if the cement-water ratio is low.

TABLE 3

| Concentration of the Milling Admixture | Visual Workability at the Values of | |
|---|---|---|
| | w = 0.25 | w = 0.21 |
| 0.05% A | 3 | 1 |
| 0.05% B | 2 | 0 |
| 0.05% C | 2 | 0 |
| 0.05% D | 2 | 0 |
| 0.05% E | 4 | 1 |
| 0.10% F | 4 | 0 |
| 0.06% G | 2–3 | 0 |
| 0.05% H | 5 | 3 |
| 0.05% I | 3 | 1 |
| 0.03% J | 5 | 3 |
| 0.05% K | 4 | 2 |
| 0.05% L | 3 | 2 |
| 0.05% M | 4 | 2 |
| 0.05% N | 5 | 2–3 |
| 0.05% O | 4 | 2 |
| 0.05% P | 5 | 2–3 |
| 0.05% R | 4 | 2 |
| 0.05% S | 4 | 2 |
| 0.05% T | 4 | 2–3 |
| 0.05% U | 5 | 2–3 |
| 0.05% V | 4 | 2 |

According to the producer's data on substances that he produced and used in the experiments, the admixtures designated A, B, C, and D are not stable in an alkaline medium of pH 8–12.

It is evident from the evaluation of these experiments that pastes with a low cement-water ratio, prepared from cements ground with milling admixtures having surface-active characteristics and lacking wetting properties, such as admixture G—silicone oil, admixture F—ethylene glycol, and admixture E—triethanolamine, are not workable. Pastes prepared from cements ground in the presence of surface-active substances with wetting properties but lacking stability in a strongly alkaline medium, such as admixtures A–D, also have poor workability. The process according to the present invention enables one to eliminate the adverse effects of an arbitrarily chosen milling admixture from a great number of surface-active substances. It is also evident from the evaluation that it is unsuitable to use classical milling admixtures, especially triethanolamine, in the production of Portland cements.

EXAMPLE 3

Cements ground with liquid milling admixtures have been prepared from clinker obtained from the cement works in Lochkov. Pastes, w=0.25, have been prepared from these cements with the admixture of 1% soda and 0.4% Kortan FM (dried sulphonated sodium-ferric polyphenolate). The workability of the pastes was evaluated according to the empirical scale described in Example 2. The strength after 24 hours was also determined. The results are shown in Table 4.

TABLE 4

| Milling Admixture | Specific Surface ($m^2/kg$) | Workability | Strength after 24 hours (MPa) |
|---|---|---|---|
| 0.05% D | 390 | 2 | 56 |
| 0.10% F | 428 | 3 | 59 |
| 0.05% H | 421 | 5 | 55.5 |
| 0.05% I | 390 | 3 | 45 |
| 0.03% J | 462 | 5 | 62 |
| 0.05% K | 390 | 4 | 69 |
| 0.05% N | 390 | 5 | 60 |
| 0.05% O | 450 | 4 | 53 |
| 0.05% R | 340 | 4 | 62 |
| 0.05% S | 400 | 4 | 57 |
| 0.05% T | 390 | 4 | 46 |
| 0.03% U | 390 | 4 | 59 |
| 0.05% V | 470 | 4 | 69 |

EXAMPLE 4

Gypsumless compositions were ground from cement clinker from Lochov with liquid milling admixtures. The following admixtures were used:

Variant A—0.4% Kortan FM (dried sulphonated sodium-ferric polyphenolate) and 1% soda.

Variant B—0.85% sodium ligninsulphonate and 1.2% potassium.

The results are shown in Table 5.

TABLE 5

| Milling Admixture Specific Surface | 0.1% N 550 $m^2/kg$ A | 0.1% N 550 $m^2/kg$ B | 0.03% U 550 $m^2/kg$ A |
|---|---|---|---|
| Admixtures | | | |
| w | 0.22 | 0.22 | 0.23 |
| Setting Time | 65 min. | 15 min. | 110 min. |
| Strength (MPa) | | | |
| 2 h after Setting | 7.5 | 3.5 | 4.0 |
| 24 hours | 65 | 60 | 72 |
| 7 days | 80 | 81 | 89 |
| 28 days | 96 | 101 | 115 |
| 180 days | 137.5 | 142 | 165 |

EXAMPLE 5

Gypsumless cements were ground from cement clinker from Prachovice with liquid milling admixtures. Concretes with a low cement-water ratio were prepared from these cements. Soda and Ralentol (liquid sulphonated sodium-ferric polyphenolate) were used as the liquid milling admixture. Sand (0–8 mm) and aggregates (8–16 mm) were added. Table 6 contains the results. The strength of concretes prepared with milling admixtures U and J was greater than MPa=50 after 24 hours.

TABLE 6

| Milling Admixture | 0.05% U | 0.05% J | 0.05% E |
|---|---|---|---|
| Specific Surface of the Cement | 520 $m^2/kg$ | 450 $m^2/kg$ | 510 $m^2/kg$ |
| w | 0.25 0.23 | 0.25 | 0.25 |
| Composition of the Concrete (cement:sand:aggregates) | 1:1.4:1.5 1:1.3:1.4 | 1:1.41:1.52 | 1:1.41:1.52 |
| Dose of Cement | 560 kg/$m^3$ 590 kg/$m^3$ | 560 kg/$m^3$ | 560 kg/$m^3$ |
| Workability | 8 with VeBe 12–15 with VeBe | 5 with VeBe | dry, uncompactable mixture |

What is claimed is:

1. A method of milling a Portland clinker suitable for the production of gypsumless cements comprising grinding said clinker in the presence of an organic, surface-active material with wetting properties that is stable in an alkaline medium of pH 9–12 selected from the group consisting of alkylpolyglycol ether sulphates wherein the alkyl group contains from 10 to 15 carbon atoms, alkylated alkanolamine-polyglycol ethers wherein the alkyl group contains from 10 to 15 carbon atoms, alcohol alkanolamides wherein the alkyl group contains from 10 to 15 carbon atoms, sulphated ethoxylated alkylated alcohols wherein the alkyl group contains form 10 to 15 carbon atoms and the number of ethoxyl groups ranges from 3 to 10, esteramines or esters of sulphonated fatty acids wherein the linear chain contains from 5 to 20 carbon atoms, condensates of naphthol sulfonic acid with formaldehyde or cresol, alkylbetaines, sulphoalkyl betaines, and mixtures thereof, excluding the triethanolamide of dodecylbenzylsulfonic acid.

2. The method of claim 1, wherein said organic, surface-active material is present in an amount ranging from 0.01 to 0.15 weight percent of the Portland clinker.

* * * * *